(12) United States Patent
McCambridge

(10) Patent No.: US 12,535,498 B2
(45) Date of Patent: Jan. 27, 2026

(54) POWERLINE CONTACT MONITORING AND ALERT SYSTEM

(71) Applicant: Marmon Utility LLC, Milford, CT (US)

(72) Inventor: Gordon McCambridge, Seymour, CT (US)

(73) Assignee: Marmon Utility LLC, Milford, CT (US)

( * ) Notice: Subject to any disclaimer, the term of this patent is extended or adjusted under 35 U.S.C. 154(b) by 0 days.

(21) Appl. No.: 18/306,481

(22) Filed: Apr. 25, 2023

(65) Prior Publication Data

US 2023/0366907 A1 Nov. 16, 2023

Related U.S. Application Data

(63) Continuation of application No. 16/787,555, filed on Feb. 11, 2020, now abandoned.

(60) Provisional application No. 62/803,705, filed on Feb. 11, 2019.

(51) Int. Cl.
| | | |
|---|---|---|
| *G01P 1/07* | (2006.01) | |
| *G01P 13/00* | (2006.01) | |
| *G08B 21/18* | (2006.01) | |
| *H02S 20/00* | (2014.01) | |
| *H04N 7/18* | (2006.01) | |

(52) U.S. Cl.
CPC ............... *G01P 1/07* (2013.01); *G01P 13/00* (2013.01); *G08B 21/182* (2013.01); *H02S 20/00* (2013.01); *H04N 7/185* (2013.01)

(58) Field of Classification Search
CPC .......... G01P 1/07; G01P 13/00; G08B 21/182; H02S 20/00; H04N 7/185
See application file for complete search history.

(56) References Cited

U.S. PATENT DOCUMENTS

| | | |
|---|---|---|
| 4,646,006 A | 2/1987 | Schweitzer, Jr. |
| 4,758,962 A | 7/1988 | Fernandes |
| 4,818,990 A | 4/1989 | Fernandes |

(Continued)

FOREIGN PATENT DOCUMENTS

| | | | |
|---|---|---|---|
| CN | 106003045 B | * | 5/2018 |
| JP | H04236111 A | | 8/1992 |

(Continued)

*Primary Examiner* — Rufus C Point
(74) *Attorney, Agent, or Firm* — Arnold & Porter Kaye Scholer LLP

(57) ABSTRACT

A device for monitoring and alerting for contact of an object with a line strung between two upright posts includes a housing having a body and a mounting portion extending from the body. A mount is positioned in the mounting portion. A camera is positioned on the mounting portion for downward viewing of the line. A processor is positioned in the housing and an accelerometer is positioned in the housing in operable communication with the processor. The device includes a power supply operably connected to the processor. When the device is positioned on the line and the accelerometer senses movement of the device, the accelerometer generates and transmits a signal to the processor. The processor analyses the signal to determine whether the signal meets a threshold and, if the threshold is met, the processor generates and transmits an alarm signal to a receiving device.

22 Claims, 3 Drawing Sheets

(56) References Cited

U.S. PATENT DOCUMENTS

| | | | |
|---|---|---|---|
| 4,904,996 A | 2/1990 | Fernandes | |
| 6,390,133 B1 | 5/2002 | Patterson | |
| 6,523,424 B1 | 2/2003 | Hayes | |
| 8,358,371 B1 | 1/2013 | Dickey | |
| 10,326,689 B2* | 6/2019 | Liu | H04W 40/16 |
| 2005/0288877 A1* | 12/2005 | Doig | G01R 21/133 702/60 |
| 2009/0243876 A1* | 10/2009 | Lilien | H02G 1/02 340/870.01 |
| 2011/0187578 A1 | 8/2011 | Farneth | |
| 2011/0196535 A1* | 8/2011 | Phillips | H02G 1/02 180/2.2 |
| 2011/0196536 A1* | 8/2011 | Phillips | H02G 1/02 901/44 |
| 2012/0046799 A1* | 2/2012 | Alex | G01R 15/142 700/298 |
| 2013/0054183 A1* | 2/2013 | Afzal | H02J 3/00 702/141 |
| 2014/0176702 A1* | 6/2014 | Davis | H01F 27/02 348/135 |
| 2015/0138347 A1 | 5/2015 | Davis | |
| 2015/0229114 A1 | 8/2015 | Jokinen | |
| 2016/0209454 A1* | 7/2016 | McCammon | G01R 1/07 |
| 2016/0322691 A1* | 11/2016 | Bennett | H01P 7/06 |

FOREIGN PATENT DOCUMENTS

| | | | | |
|---|---|---|---|---|
| JP | H04236111 A * | 8/1992 | | |
| KR | 101277119 B1 * | 6/2013 | | H02G 1/04 |
| KR | 20180089622 A * | 8/2018 | | |
| SU | 1753527 A1 | 8/1992 | | |

* cited by examiner

POWERLINE CONTACT MONITORING AND ALERT SYSTEM

CROSS-REFERENCE TO RELATED APPLICATION DATA

This application is a continuation of U.S. patent application Ser. No. 16/787,555, filed Feb. 11, 2020, titled, POWERLINE CONTACT MONITORING AND ALERT SYSTEM, which claims the benefit of and priority to Provisional U.S. Patent Application Ser. No. 62/803,705, filed Feb. 11, 2019, titled, POWERLINE CONTACT MONITORING AND ALERT SYSTEM, the disclosures of which are incorporated herein in their entireties.

BACKGROUND

The present disclosure relates generally to a system for monitoring and alerting to the contact of an object with lines or wires strung between upright posts, such as powerlines that are supported by and strung between upright posts.

The electrical power supply system comprises three general areas: generation, transmission and distribution. Generation is generating power by, for example, power plant. Transmission is the movement of high voltage power (electricity) from, for example, a power plant to an electrical substation. Distribution is the movement of lower voltage power locally from, for example, a substation through a neighborhood to homes, businesses and the like.

Distribution can be underground or overhead. In overhead distribution, conductors are suspended from arms mounted to poles. The conductors can be bare conductors that are suspended individually or independently from the arms by insulators, they can be covered (insulated) conductors that are suspended individually or independently from the arms, or they can be covered conductors that are suspended together on a spacing device from a non-conducting messenger wire. One such spacing device is a Hendrix Aerial Cable System (ACS) spacer cable system.

Covered conductor systems provide a number of advantages over bare wire systems. For example, unlike bare wire systems, covered conductor systems can continue to operate when contacted by a grounded object, such as a tree limb. That is, bare wire systems will trip or shut down when a tree limb contacts the wire, whereas a covered conductor system will continue to operate. As such, covered conductor systems provide a benefit over bare wire systems.

One drawback to covered conductors is the although the system will not trip or shut down, there is no way to determine whether there is contact of an object with the conductor, that is, the conductor can tolerate short duration contact, long term contact duration will lead to insulation damage eventually resulting in the circuit or system failure.

Accordingly, there is a need for a system to monitor contact with covered conductor systems. Desirably, such a system provides an alert that the conductor has been contacted by an object prior to long-term failure of the conductor and system. More desirably still, such as system can determine whether the contact is long term or fix a short duration. Still more desirably, such a system can also provide for visual inspection of the conductor and Ern object in contact with the conductor.

SUMMARY

A device monitors and alerts for contact of an object with a line, such as a power transmission line, a communication line or the like that is strung between two upright posts, such as poles. The device includes a housing having a body and a mounting portion extending from the body. A mount is positioned in the mounting portion to mount the device to a line.

A processor and an accelerometer are positioned in the housing, the accelerometer in operable communication with the processor. A power supply is operably connected to the processor.

When the device is positioned on the line and the accelerometer senses movement of the device, the accelerometer generates and transmits a signal to the processor. The processor analyzes the signal to determine whether the signal meets a threshold and, if the threshold is met, the processor generates and transmits an alarm signal to a receiving device.

In an embodiment, the further includes a camera. The camera captures an image when the threshold is met. The image can be transmitted to the receiving device.

The device includes a mount in the mounting portion. In an embodiment, the camera is positioned in the mounting portion spaced from the mount. The device can include a second mounting portion extending from the body having a second mount, the mounting portions being spaced from each other. Cameras can be positioned in each mounting portion. In an embodiment, the mounts are positioned in their respective mounting portions between the body and the cameras. Such an arrangement allows for downward viewing of the line by the camera.

In an embodiment, the power supply is one or more solar cells. The solar cells can be positioned on the housing. In an embodiment, the housing has a generally three-sided cross-section and the solar cells are positioned on two side of the housing. In an embodiment, the housing includes a receiver on the body for receiving an associated installation tool or "hot stick".

DETAILED DESCRIPTION

Figure 1:
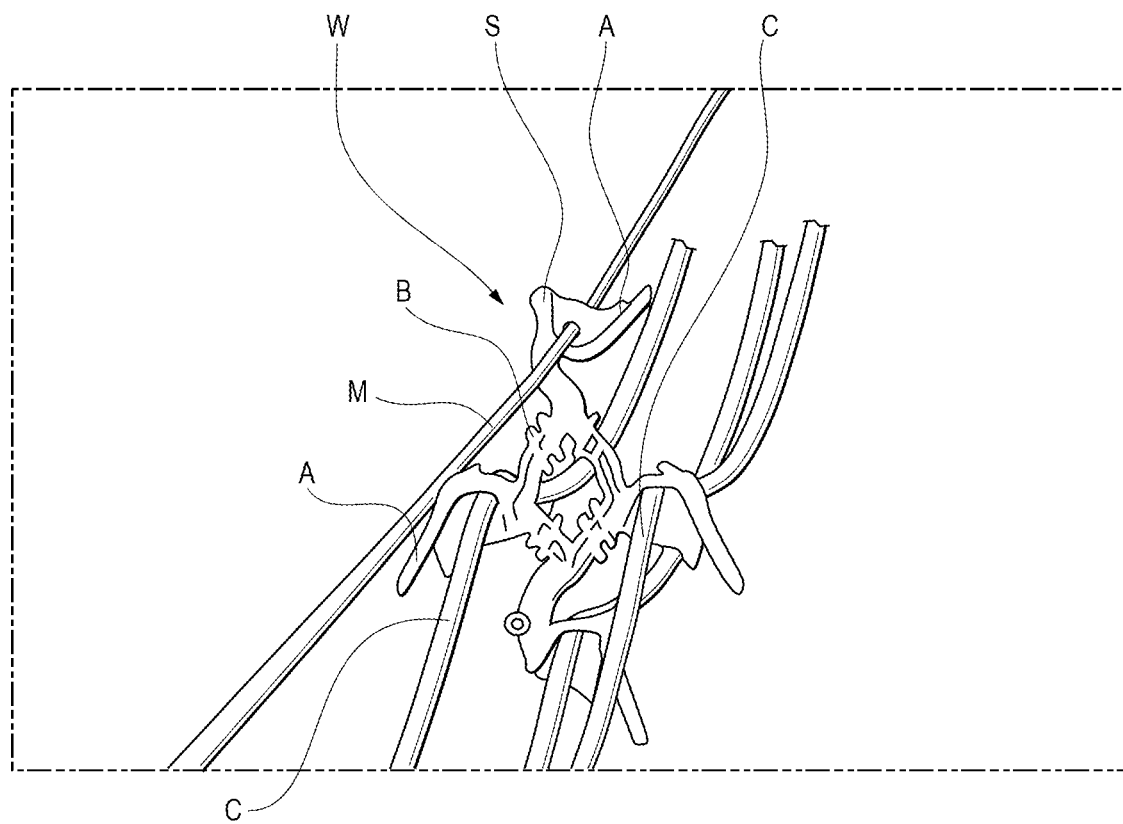
FIG. 1 is an illustration showing one example of a space wire system for suspending multiple conductors.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

FIG. 1 illustrates one example of a space wire system W for suspending electrical conductors C. The space wire system W includes a support S or a carriage to suspend the plurality of conductors C. In the illustrated embodiment the carriage S includes a central body portion B and a plurality of arms A that extend from the body B. Each arm A supports a conductor C so as to space the conductors C from each other so that no conductor C contacts any other conductor C. The arms A may be configured to lock the conductors C in place.

The carriage S is suspended from a wire such as a messenger wire M. As such, the conductors C are indirectly supported by the messenger wire M. In a typical configuration, the messenger wire M is a non-conducting wire. However, those skilled in the art will appreciate that the messenger wire M may be a conductor of one type or another. For example, the messenger wire M may be a communications and/or control wire.

Figure 2:
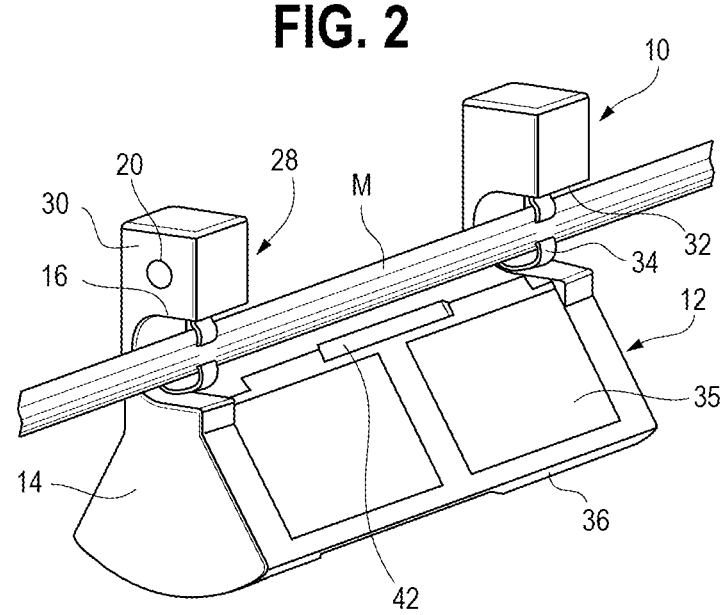
FIG. 2 illustrates an embodiment of a system for monitoring and alerting to the contact of an object with powerlines.

FIG. 2 illustrates an embodiment of a system 10 for monitoring and alerting to the contact of an object, such as a tree limb, with lines or wires, for example conductors C or messenger wires M, strung between upright posts. In an embodiment, the system 10 includes a monitoring device 12 that includes, generally, a housing 14 having a body 15, mounts 16, a power source 18, a camera 20, a processor 22 and operating circuitry 24. The monitoring device 12 includes one or more accelerometers 26, such as one or more 3-axis accelerometers, that can be incorporated into the processor 22 and/or the operating circuitry 24.

In an embodiment, the mounts 16 are formed as mounting portions 28 that are, in part, integral with the body 15. The mounting portions 28 can be formed as upstanding posts 30 that extend upwardly from the body 15. The posts 30 each include the mount 16 which, in the illustrated embodiment is a recess 32, such as the C-shaped recess that defines an open side of the post 30 and a clip 34, such as the illustrated spring clip, that is positioned in each recess 32. The clips 32 permit insertion of the monitoring device 12 onto a wire, such as a messenger wire M, and removal of the device 12 from the wire M, preferably without the use of a tool. In an embodiment, the clips 34 are configured such that the monitoring device 12 remains fixed relative to the wire M and, for example, will rotate with the wire M as a torque (twisting) is applied to the wire M.

Figure 3:
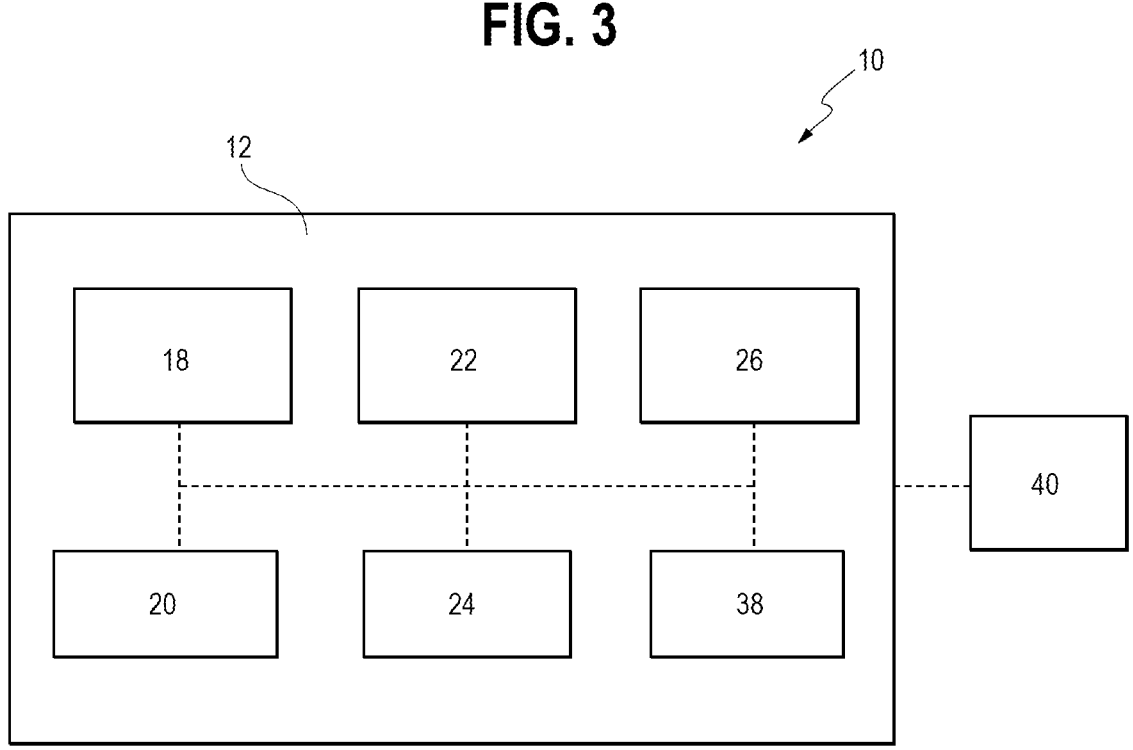
FIG. 3 is a block diagram of a monitoring device in the system.

In an embodiment, the housing 12 has an overall or generally triangular shaped cross-section. In an embodiment a bottom 36 of the housing 12 is rounded or curved. In an embodiment, the monitoring device 12 is powered internally, that is the monitoring device 12 has no external power source. As seen in FIGS. 2 and 3, the power supply 18 can be solar cells 35 can be positioned on the sides of the body 15. The solar cells 35 can provide power to the device 12 during daylight hours. The device 12 can be configured having batteries 38 to store power for use during evening hours or when the daylight is insufficient to power the device 12.

One or more accelerometers 26 are configured to sense movement of the device 12. The one or more accelerometers 26 can communicate with the processor 22 to generate signals based on movement of the accelerometers 26, the rate of movement, an orientation or angle of the accelerometers 26 (which correlates to an orientation of the device 12), and other movement and direction/orientation actions/reactions of the accelerometers 26/device 12.

In an embodiment, the device 12 includes one or more cameras 20. As seen in FIG. 2, a camera 20 can be positioned on an outer wall of the upstanding post 30. Cameras 20 can be positioned on outside walls of both posts 30. The cameras 30 permit visual inspection of the wire M and the conductors C suspended from the wire M (the conductors C suspended by the space wire carriage S). The cameras 30 are located on the upstanding posts, above (vertically) the location at which the device 12 is mounted to the wire M. This permits viewing down onto the wire M and conductors C from a vantage point that advantageously provides a large field of view of the wire M and any object or objects that are contacting the wire M or conductors C.

The device 12 can communicate information and images. In an embodiment, the device 12 communicates the information and images to a receiving device 40 via a wireless protocol, such as WIFI, WAN, LAN, long range (LoRa) communications, cellular transmission, Bluetooth or any other wireless protocol know or not yet known.

In an embodiment the housing 14 includes a tool receiver 42, such as the illustrated slot to accommodate a mounting tool, referred to as a "hot stick" (not shown). Those skilled in the art will recognize and appreciate that unlike known devices, the present device 12 is advantageously mounted while the conductors C are "live" or "hot". Mounting of the device 12 while the conductors C are "hot" is referred to as "hotsticking". The tool receiver 42 permits mounting the device 12 to the tool and installing the device 12 on the wire M with the conductors C hot, thus eliminating the need to power down the lines or circuit to install or maintain the monitoring device 12. The tool receiver 42 likewise allows for removing the device from the wire M while the conductors are "hot".

Figure 4:
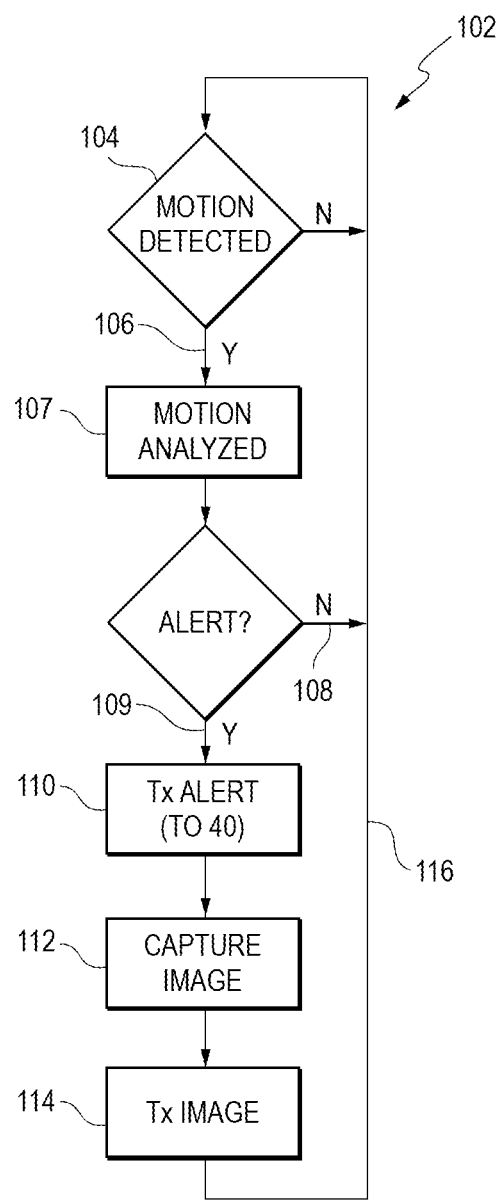
FIG. 4 is an example of a logic flow diagram for operation of the system for monitoring and alerting to the contact of an object with powerlines.

One example protocol for the monitoring system 10, or monitoring method, is illustrated at 102 in FIG. 4. In a motion detect mode, the device 12 is active and in a standby state—that is, the accelerometers 26 do not sense movement of the device 12 (or the wire M), as at 104. When motion is detected by the device 12 (motion on the wire M), as at 106, the motion is analyzed by an embedded algorithm as at 107. If the motion is determined to be anomalous or a non-alert motion (such as a bird on the wire M or wind rocking the wire M), the device returns to the standby state as at 108. If the motion as analyzed rises to an alert state (as at 109), such as circuit line contact, meeting or exceeding a threshold of movement, a message is transmitted to the receiving device 40 at, for example, a maintenance station, a user's smart device (phone or the like), or other receiving device as at 110. The message can be, for example, a text message if transmitted to a user's smart device, an alert, an alarm, or other notification. An image is captured by the camera 20 as at 112. The image can be transmitted with the message (the alert message) or the image can be transmitted following the alert message, as at 114. Again, the image can be transmitted to, for example, a maintenance station, a user's smart device (phone or the like), or other receiving device. Once the image is transmitted, the device returns to the standby state as qt 116.

Figure 5:
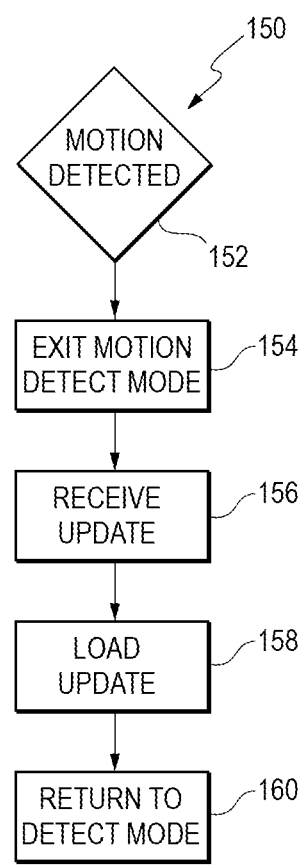
FIG. 5 is an example of a logic flow diagram for updating the firmware of the system.

Referring to FIG. 5, the system 10 firmware can also upgrade automatically as at 150. The device 12 receives an update interrupt signal as at 152. The device 12 exits detection mode as at 154 and temporarily suspends the ability to detect motion. An update is received as at 156 and the device firmware updates or loads as at 158. Once the update or load is complete, the device 12 returns to detect mode as at 160.

It will also be appreciated that the system 10 can be used for general maintenance, by, for example, periodically (automatically or manually) capturing and transmitting images of the line M and/or conductors C for viewing and storage.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, forward and the like are for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A device for monitoring and alerting for contact of an object with a line strung between two upright posts, the device comprising:
- a housing, the housing having a body and at least a first and second mounting portion spaced apart from each other and extending upwardly from the body;
- a mount positioned in each of the first and second mounting portions;
- a processor in the housing;
- an accelerometer in the housing in operable communication with the processor, wherein the accelerometer communicates with the processor to generate one or more signals based on a rate of movement of the accelerometer and an orientation or angle of the accelerometer;
- a power supply operably connected to the processor; and
- a camera positioned in each of the first and second mounting portions, the cameras positioned above the mounts in each of the mounting portions to provide a downward view of a line on which the device is mounted,
- wherein when the device is positioned on the line and the accelerometer senses movement of the device, the processor analyzes the rate of movement of the accelerometer and the orientation or angle of the accelerometer to determine whether the movement meets or exceeds a threshold of movement associated with an alert state and, if the threshold is met or exceeded, the processor generates and transmits an alarm signal to a receiving device.

2. The device of claim 1, including a plurality of accelerometers.

3. The device of claim 1, wherein the power supply is a battery.

4. The device of claim 1, wherein the device generates and transmits the alarm signal via a wireless protocol.

5. The device of claim 4, wherein the wireless protocol is one or more of WIFI, WAN, LAN, long range (LoRa) communications, cellular transmission, and Bluetooth.

6. The device of claim 5, wherein the wireless protocol is cellular transmission.

7. The device of claim 1, further including a transmitter.

8. The device of claim 1, wherein the first and second mounting portions each form an upstanding post that includes a recess configured to receive the line.

9. The device of claim 1, wherein an image captured by at least one of the cameras is transmitted to the receiving device responsive to determining that the signal meets or exceeds the threshold.

10. The device of claim 1, wherein the cameras positioned in each of the mounting portions are positioned on an outer wall of the respective mounting portions.

11. The device of claim 1, wherein the cameras positioned in each of the mounting portions are positioned vertically above a location at which the device is mounted to the line.

12. The device of claim 1, wherein the first and second mounting portions are integral with the body of the housing.

13. A method for monitoring and alerting for contact of an object with a line strung between two upright posts, the method comprising:
- mounting a monitoring and altering device on a line, wherein the device comprises a housing having a body and at least a first and second mounting portion spaced apart from each other and extending upwardly from the body, and wherein each of the first and second mounting portions include a camera positioned vertically above a location at which the device is mounted to the line;
- detecting movement of the line via at least one accelerometer of the device;
- generating one or more signals based on a rate of movement of the at least one accelerometer and an orientation or angle of the at least one accelerometer;
- determining that the movement of the line meets or exceeds a threshold of movement associated with an alert state based on at least the rate of movement of the at least one accelerometer and an orientation or angle of the at least one accelerometer; and
- responsive to determining that the movement of the line meets or exceeds the threshold of movement associated with an alert state, capturing an image by at least one of the cameras included in the first and second mounting portions and transmitting a notification to a receiving device, wherein the notification includes the image.

14. The method of claim 13, further including awakening the device from the standby mode.

15. The method of claim 13, wherein following transmitting the message, returning the device to a standby mode.

16. The method of claim 13, wherein the notification is a message.

17. The method of claim 13, wherein the notification is transmitted via a wireless protocol.

18. The method of claim 17, wherein the wireless protocol is one or more of WIFI, WAN, LAN, long range (LoRa) communications, cellular transmission, and Bluetooth.

19. The method of claim 18, wherein the wireless protocol is cellular transmission.

20. The method of claim 13, wherein the notification comprises an alert or an alarm.

21. The method of claim 13, wherein the receiving device comprises a maintenance station or a user device.

22. The method of claim 13, wherein transmitting the notification to the receiving device comprises transmitting a text message to a user device.

* * * * *